L. W. BEECHER.
Churn.
No. 18,671.
Patented Nov. 24, 1857.
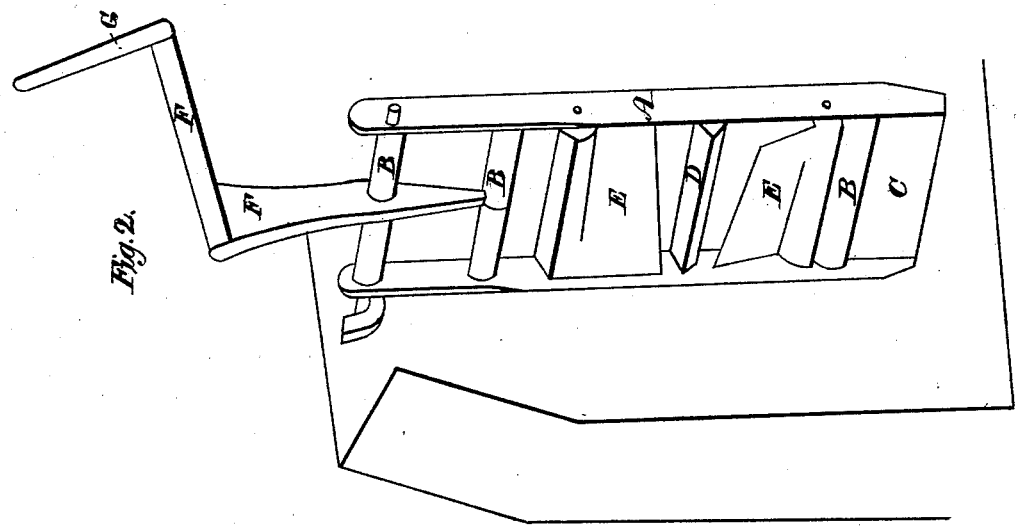
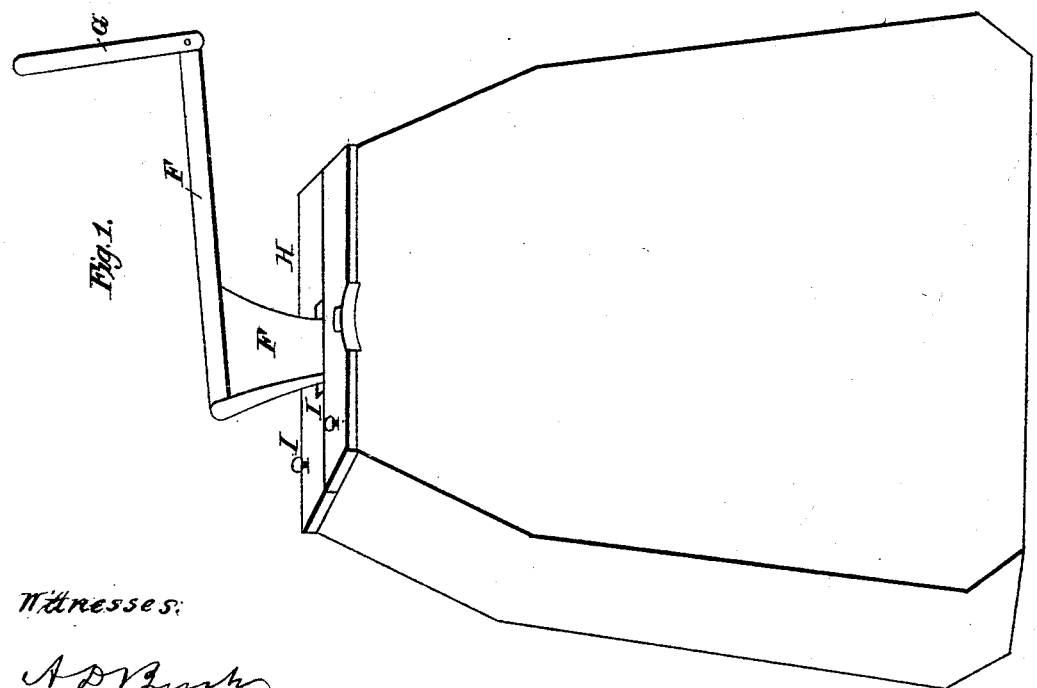
Witnesses:

UNITED STATES PATENT OFFICE.

LEWIS W. BEECHER, OF AVON, NEW YORK.

CHURN.

Specification of Letters Patent No. 18,671, dated November 24, 1857.

*To all whom it may concern:*

Be it known that I, LEWIS W. BEECHER, of the town of Avon, in the county of Livingston and State of New York, have invented a new and useful Mode of Converting Cream into Butter—in the construction of a churn box and the beaters so constructed and arranged and the application of the atmospheric air such that more butter is produced from the same amount of cream than any mode or device now in use, and by the application of the power applied the work is done with ease, and any one of sufficient judgment can do the work; and I do hereby declare that the following is a full, clear, and exact description of the construction and operation of the same, reference being had to the annexed drawings, making a part of this specification, in which—

Figure (1) is a perspective view of the churn box. Fig. (2) is the dash frame. The churn box is of a pyramidal shape, with gambrel shaped ends, which is to be made of thick double tin, for the purpose of giving the cream a proper temperature which is done by putting the churn into a common tub and applying cold or hot water to the outside of the churn box as may be required. The dimensions of a medium size are as follows: The sides at the bottom, to be 18 inches wide, at the lower angle $18\frac{3}{4}$ inches wide, at the upper angle $10\frac{1}{2}$ inches wide, at the top 7 inches wide. The ends at the bottom to be 9 inches wide at the top 8 inches wide, and 23 inches in height, the lower angle to be $2\frac{1}{4}$ inches from the bottom the upper angle to be 18 inches from the bottom. The above named size box will hold and churn six gallons of cream.

Letter A, is a vertical pendulum motion frame hung at the top of the churn box upon pivots in the center of the box.

B, B, B, are three bars that hold the frame together; C, a flat lifting beater at the bottom of the dash frame; D, a dividing rod between the valves or swing beaters; E, E, swing beaters hung in the frame and allowed to turn each way to an eighth of a circle, the lower one to be $3\frac{1}{2}$ inches wide, the upper one 7 inches wide, with attenuated edges; F, F, two pieces united forming the lever the perpendicular part being attached to the frame; (G,) hand staff attached to the extreme end of the horizontal part of the lever and by which motion is given to the frame; H, lid in two pieces; I, I, buttons to hold the lids down, and keep the frame in its place when in motion; (K,) a loop handle at the bottom of the churn box.

The operation is as follows: When the frame is put in motion one half of the cream is forced up and against the end of the churn box in the shape of a wedge, and is then divided by the rod D. The lower part passes through upon the lower valve in an upward diagonal direction to the opposite end of the churn box at the same time the upper part passes downward in a diagonal direction to the same end that the other part did, and being the larger and heavier part forces the whole to the bottom of the churn, so that at every vibration of the frame the same operation is performed, which motion creates a current of air from the top, and forcing the particles of butter down from the top to the bottom where they are gathered and rolled into two rolls, one upon each side of the dash frame, and the butter milk completely worked out.

What I claim as my invention and desire to secure by Letters Patent, is—

The swing valves or beaters operating and producing the effects substantially as set forth.

LEWIS W. BEECHER.

Witnesses:
C. A. HOSMER,
G. BLACKWELL.